US012649446B2

(12) United States Patent
Samayamantula et al.

(10) Patent No.: US 12,649,446 B2
(45) Date of Patent: Jun. 9, 2026

(54) ELECTRONIC PARK BRAKE SYSTEM WITH VEHICLE MOTION STATE INPUT

(71) Applicant: KB Intellectual Property GmbH & Co. KG, Pullach (DE)

(72) Inventors: Jeswanth Samayamantula, Avon Lake, OH (US); Thomas J. Hayes, Lakewood, OH (US); Eugen Stroh, Hambuch (DE); Zoltan Richard Kiss, Dunaharaszti (HU)

(73) Assignee: KB Intellectual Property GmbH & Co. KG, Pullach (DE)

( * ) Notice: Subject to any disclaimer, the term of this patent is extended or adjusted under 35 U.S.C. 154(b) by 64 days.

(21) Appl. No.: 18/825,765

(22) Filed: Sep. 5, 2024

(65) Prior Publication Data

US 2026/0061976 A1 Mar. 5, 2026

(51) Int. Cl.
*B60T 7/12* (2006.01)
*B60T 8/88* (2006.01)

(52) U.S. Cl.
CPC ................ *B60T 7/12* (2013.01); *B60T 8/885* (2013.01); *B60T 2270/413* (2013.01)

(58) Field of Classification Search
CPC ....... B60T 7/12; B60T 8/885; B60T 2270/413
See application file for complete search history.

(56) References Cited

U.S. PATENT DOCUMENTS

| | | | |
|---|---|---|---|
| 2004/0113489 A1* | 6/2004 | Iwagawa ................ | B60T 7/107 |
| | | | 303/155 |
| 2007/0194904 A1* | 8/2007 | Wey ......................... | B60T 8/32 |
| | | | 340/467 |
| 2008/0039288 A1* | 2/2008 | Jagodzinski .............. | B60T 7/12 |
| | | | 477/197 |
| 2008/0087509 A1* | 4/2008 | Kalbeck ................... | B60T 7/12 |
| | | | 701/70 |
| 2011/0004386 A1* | 1/2011 | Kinder .................... | B60T 8/885 |
| | | | 701/70 |
| 2021/0362664 A1* | 11/2021 | Yang ...................... | G01S 13/931 |
| 2022/0297548 A1* | 9/2022 | Oh .......................... | B60T 8/245 |
| 2024/0286597 A1* | 8/2024 | Wang ............... | B60W 50/0205 |

FOREIGN PATENT DOCUMENTS

CN          110682876 A          1/2020

* cited by examiner

*Primary Examiner* — Long T Tran
(74) *Attorney, Agent, or Firm* — Crowell & Moring LLP

(57) ABSTRACT

An electronic park brake system includes a first electronic control unit configured to receive and compare at least first and second speed inputs and provide a quality indicator signal indicating a quality of a vehicle speed signal being delivered to an electronic brake control unit. The electronic park brake control unit is configured to receive the quality indicator signal and the vehicle speed signal, determine a motion state of the vehicle and maintain a full operational state of an electronic park brake if the quality indicator signal is a high quality signal, and limit the operational state of the electronic park brake if the quality indicator signal is a medium quality signal or a low quality signal. Methods of using the system are also provided.

15 Claims, 5 Drawing Sheets

ELECTRONIC PARK BRAKE SYSTEM WITH VEHICLE MOTION STATE INPUT

FIELD OF THE INVENTION

The present application relates generally to an electronic park brake system with vehicle motion state input, and to methods for the use thereof.

BACKGROUND

Electronic park brake systems rely on various inputs, or input signals, to allow for proper control of the electronic park brake. Typically, if the quality of the input signal is low, such systems may set a fault and shut down the system, rather than maintaining some level of operability. As such, the electronic park brake system may become unavailable in certain situations, leading to a less robust system.

SUMMARY

The present invention is defined by the following claims, and nothing in this section should be considered to be a limitation on those claims.

In one aspect, one embodiment of an electronic park brake system includes a first electronic control unit configured to receive and compare at least first and second speed inputs and provide a quality indicator signal indicating a quality of a vehicle speed signal being delivered to an electronic brake control unit. The electronic park brake control unit is configured to receive the quality indicator signal and the vehicle speed signal and determine a motion state of the vehicle. The electronic park brake control unit is further configured to maintain a full operational state of an electronic park brake if the quality indicator signal is a high quality signal, and limit the operational state of the electronic park brake if the quality indicator signal is a medium quality signal or a low quality signal.

In another aspect, one embodiment of a method of operating an electronic park brake system includes comparing first and second speed inputs communicated to a first electronic control unit, providing a quality indicator signal from the first electronic control unit indicating a quality of a vehicle speed signal, receiving the quality indicator signal and the vehicle speed signal with an electronic park brake control unit, determining a motion state of the vehicle with the electronic brake control unit, and maintaining or disabling an operation of an electronic park brake based on the quality indicator signal and the motion state of the vehicle.

The various embodiments of the electronic park brake system, and methods for the use thereof, provide significant advantages over other electronic brake systems and methods. For example, and without limitation, the system provides full operational functionality, or more limited functionality, depending on the quality of the input signal. In this way, the system may remain operational, on a more limited basis, if the quality of the signal(s) is/are in question, thereby increasing the availability of the system, as well as the robustness thereof.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION OF THE PRESENTLY PREFERRED EMBODIMENTS

It should be understood that the term "plurality," as used herein, means two or more. The term "coupled" means connected to or engaged with, whether directly or indirectly, for example with an intervening member, and does not require the engagement to be fixed or permanent, although it may be fixed or permanent. The terms "first," "second," and so on, as used herein, are not meant to be assigned to a particular component or feature so designated, but rather are simply referring to such components and features in the numerical order as addressed, meaning that a component or feature designated as "first" may later be a "second" such component or feature, depending on the order in which it is referred. It should also be understood that designation of "first" and "second" does not necessarily mean that the two components, features or values so designated are different, meaning for example a first direction may be the same as a second direction, with each simply being applicable to different components or features.

Figure 1:
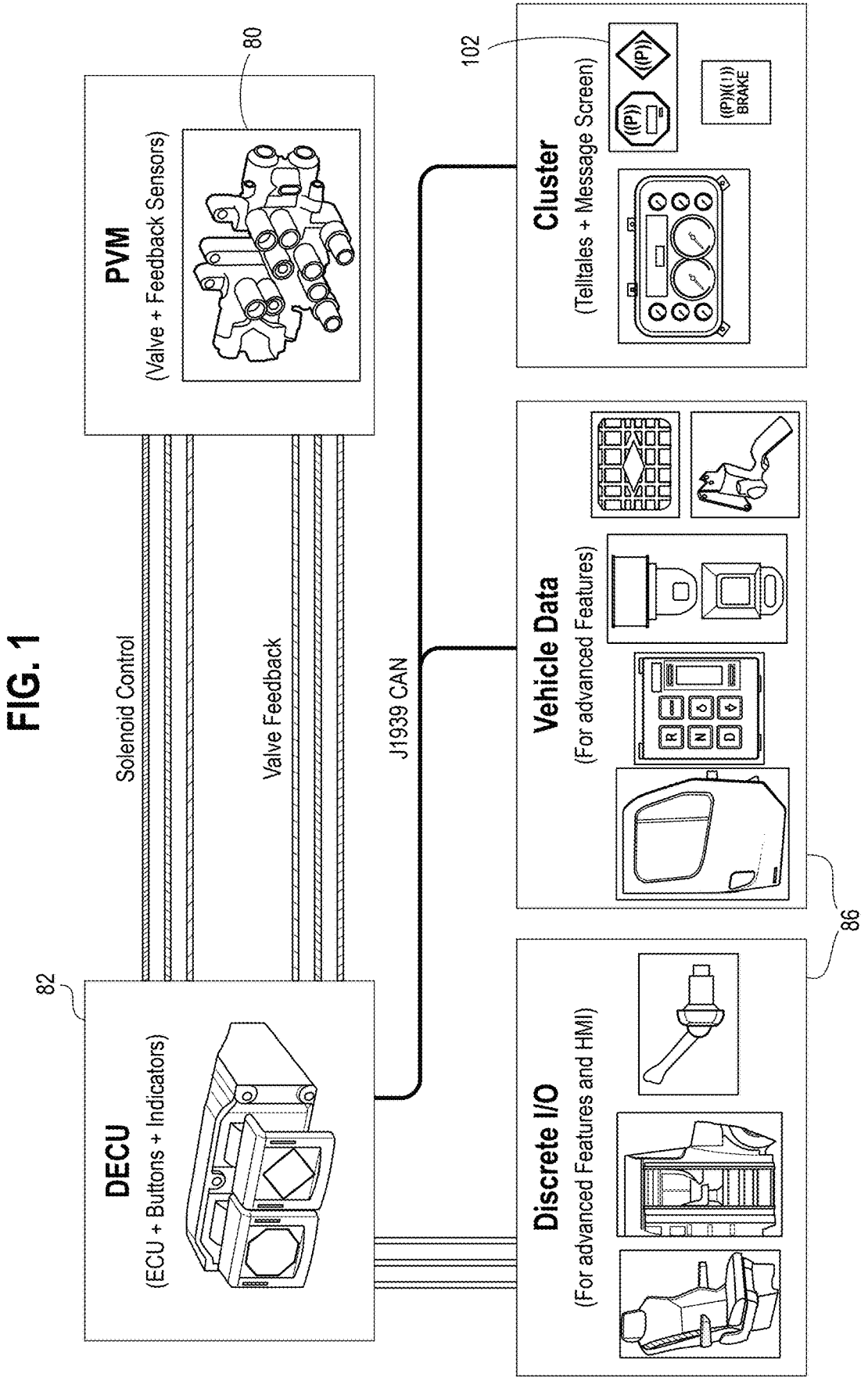
FIG. 1 is a schematic overview of an electronic park brake system.
Figure 2:
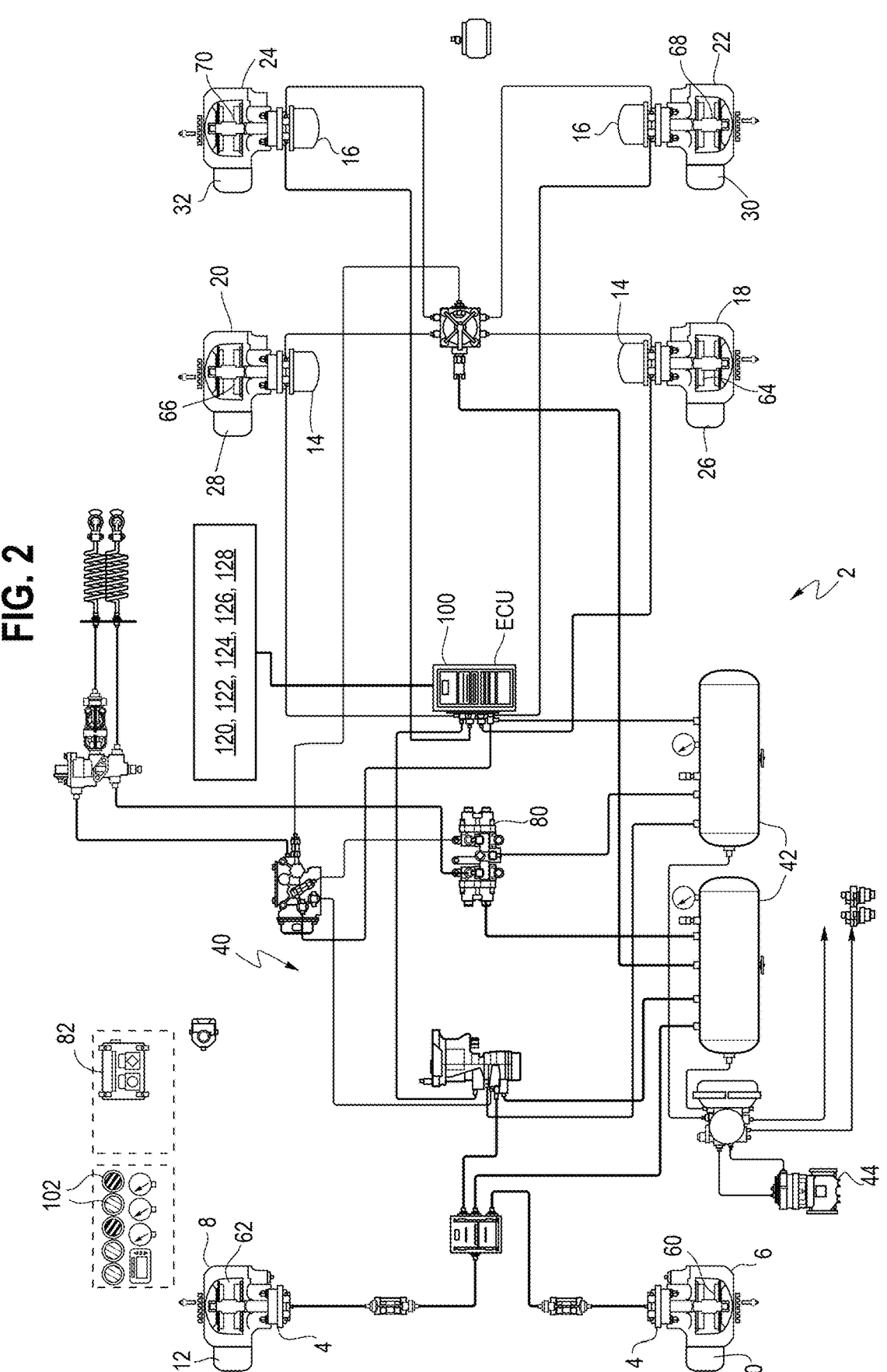
FIG. 2 is a pneumatic schematic representation of the vehicle brake system.
Figure 3:
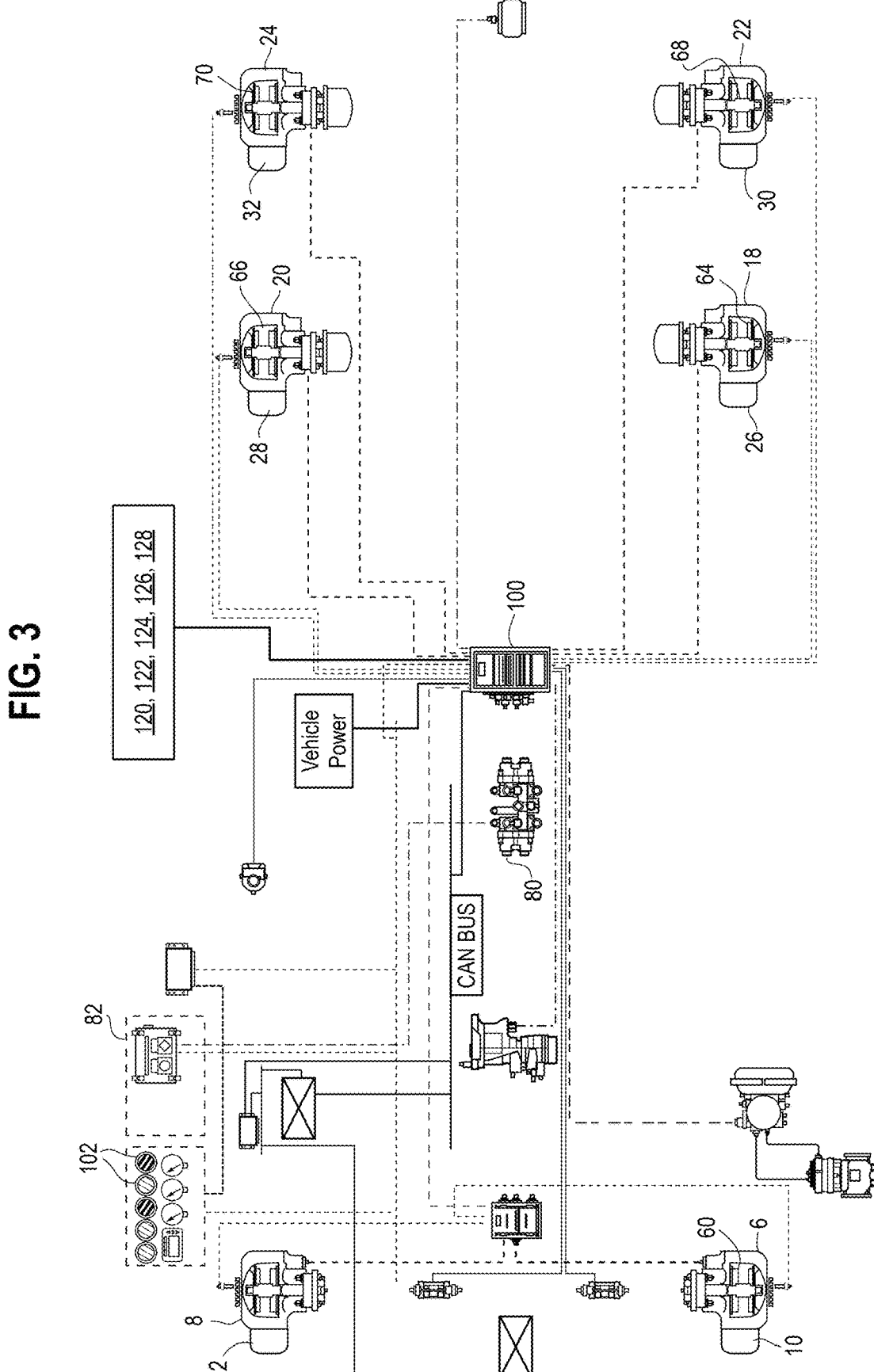
FIG. 3 is wiring schematic representation of the vehicle brake system.

Referring to FIGS. 1-3, a vehicle 2 includes a front axle 4 with a left wheel 6 and a right wheel 8, each equipped with a wheel speed sensor 10, 12. The vehicle may have a rear drive axle 14, and an additional axle 16, both also having right hand and left hand wheels 18, 20, 22, 24 and corresponding wheel speed sensors 26, 28, 30, 32. Each wheel 6, 8, 18, 20, 22, 24 is configured with a spring brake 60, 62, 64, 66, 68, 70, which may be activated by an electronic park brake system 40, shown in FIGS. 1-3. In one embodiment of the electronic park brake system 40, an air compressor 44 is coupled to one or more air reservoirs 42, which supply air to the brakes 60, 62, 64, 66, 68, 70 through one or more pneumatic valves. Referring to FIG. 1, the system includes an electronic park brake control unit 82, or controller, which may be configured as a dash electronic control unit (DECU). The DECU is an integrated human-machine interface and electronic park brake control unit. The electronic park brake control unit 82 may include one or more microcontrollers, which may include a processor, memory and input/output (I/O) peripherals. The electronic park brake control unit 82 monitors and controls the park valve module (PVM) 80 to provide parking capability for commercial vehicles that utilize air brakes. The electronic park brake control unit 82 also receives signals regarding the status of various vehicle devices 86, such as driver presence and driver interaction, to perform advanced features and functions. The valve module 80 delivers air to and exhausts air from the power vehicle park system and trailer supply as commanded by the electronic park brake control unit 82. The valve module 80 contains up to two pressure sensors, one at each delivery port, to provide an indication of the valve output pressure to the electronic park brake control unit 82. The valve module 80 may be configured as a pneumatic valve containing four solenoids, which receives supply air from the primary and secondary vehicle supply reservoirs 42. The electronic park brake control unit 82 may also provide advanced control functions for the electronic park brake system.

For example, and without limitation, the electronic park brake system 40 may include an Anti-Roll-Away (ARA) feature. The Anti-Roll-Away feature mitigates the possibility of a roll-away resulting from the driver failing to park the vehicle 2. The electronic park brake control unit 82, e.g., DECU, provides the ability to detect some situations where the vehicle is un-parked, and the driver is not in control of the vehicle, based on inputs from the vehicle devices 86 including without limitation the cab doors, service brakes, and/or engine throttle pedal. In response to a predetermined sequence of inputs, Anti-Roll-Away (ARA) will automatically set the parking brake. The electronic park brake control unit 82 may detect a situation where the driver has forgotten to release the trailer brakes, for example by receiving inputs about a predetermined combination of events: the power unit spring brakes are released, the vehicle is in motion, no air is being delivered to the trailer red line, and other inputs which depend on vehicle type. If the electronic park brake control unit 82 detects, or observes this combination of events, the control unit will send a signal to charge the trailer pneumatic line, thereby releasing the trailer spring brakes if a trailer is connected and the parking brake system downstream of the valve. If a trailer is not connected and the electronic park brake control unit attempts to charge the trailer pneumatic line, the driver may hear air exiting the pneumatic line and/or may observe a loss in reservoir pressure. The driver may then stop air delivery to the trailer red line. In this way, the control unit automatically releases the trailer parking brakes when the system detects that the driver forgets and when the system recognizes that the trailer is in motion but is still in a parked state.

The electronic park brake system 40 may also include an Exhaust-At-Speed (EAS) feature. The operator may exhaust or engage the spring brakes of the tractor and/or trailer by actuating one or more switches. The Exhaust-At-Speed feature will automatically move the valve to the deliver position once the driver has released the switch(es) and it has returned to its neutral position (i.e., if the driver releases the switch, the power unit and towed unit channels will be re-charged with air if reservoir pressures are sufficiently high). In an emergency, the electronic park brake control may assist the driver in slowing the vehicle when the service brakes are not available.

The electronic park brake system 40 may also include an external park brake request feature, for example an external request to charge or exhaust the spring brakes.

Referring to FIGS. 1-5, the electronic park brake system 40 may also include an electronic brake control unit 100, separate from the electronic park brake control unit 82. The electronic brake control unit 100 may include one or more microcontrollers, which may include a processor, memory and input/output (I/O) peripherals. The electronic brake control unit 100 is configured to receive and compare at least first and second speed inputs and provide a quality indicator signal indicating a quality of a vehicle speed signal. For example, a first input may be an actual speed, or an input about the availability of a quality evaluated speed. A second input may indicate whether speed information is available from all sensors in a full performance state, or whether there is a signal restriction and/or a resolution restriction.

The electronic park brake control unit 82 is configured to receive the quality indicator signal and the vehicle speed signal and determine a motion state of the vehicle. The electronic park brake control unit 82 is configured to maintain a full operational state of the electronic park brake if the quality indicator signal comprises a high quality signal. For example, the 82 maintains and enables, for example and without limitation, the ARA and EAS features when receiving a high quality, quality indictor signal from the electronic brake control unit 100. At the same time, the electronic park brake control unit 82 is configured to limit the operational state, for example disabling the ARA and/or EAS features while maintaining manual operation in manual mode, of the electronic park brake if the quality indicator signal is a medium quality signal or a low quality signal. Moreover, in the full operational state, the system allows for controller area network (CAN) based requests for spring brake control.

In one embodiment, the electronic park brake control unit 82 is configured to output a warning signal if the quality indicator signal is one of the medium quality signal or the low quality signal. The warning signal may be configured to activate a warning lamp 102.

In one embodiment, the electronic park brake control unit 82 is provided with full functionality or with limitations based on the availability and quality of certain input signals from electronic brake control unit 100. The electronic brake control unit 100 determine the quality of the input signal. The electronic park brake control unit 82 then uses the transmitted input signal and the quality indicator signal to determine the level of operation for the electronic park brake, or spring brake on the non-steer axle which maintains the vehicle in the park status. This input increases the availability of the system by reducing its capability when the quality of other interfaces is low, rather than the simply setting a fault and shutting down.

In one embodiment, the task is achieved using the combined wheel speed information, or input signal, and the quality indictor signal generated by electronic brake control unit 100, to determine the motion state, and based on the motion state, the electronic park brake system 40 will be either fully operational or have reduced operational capability.

Figure 5:
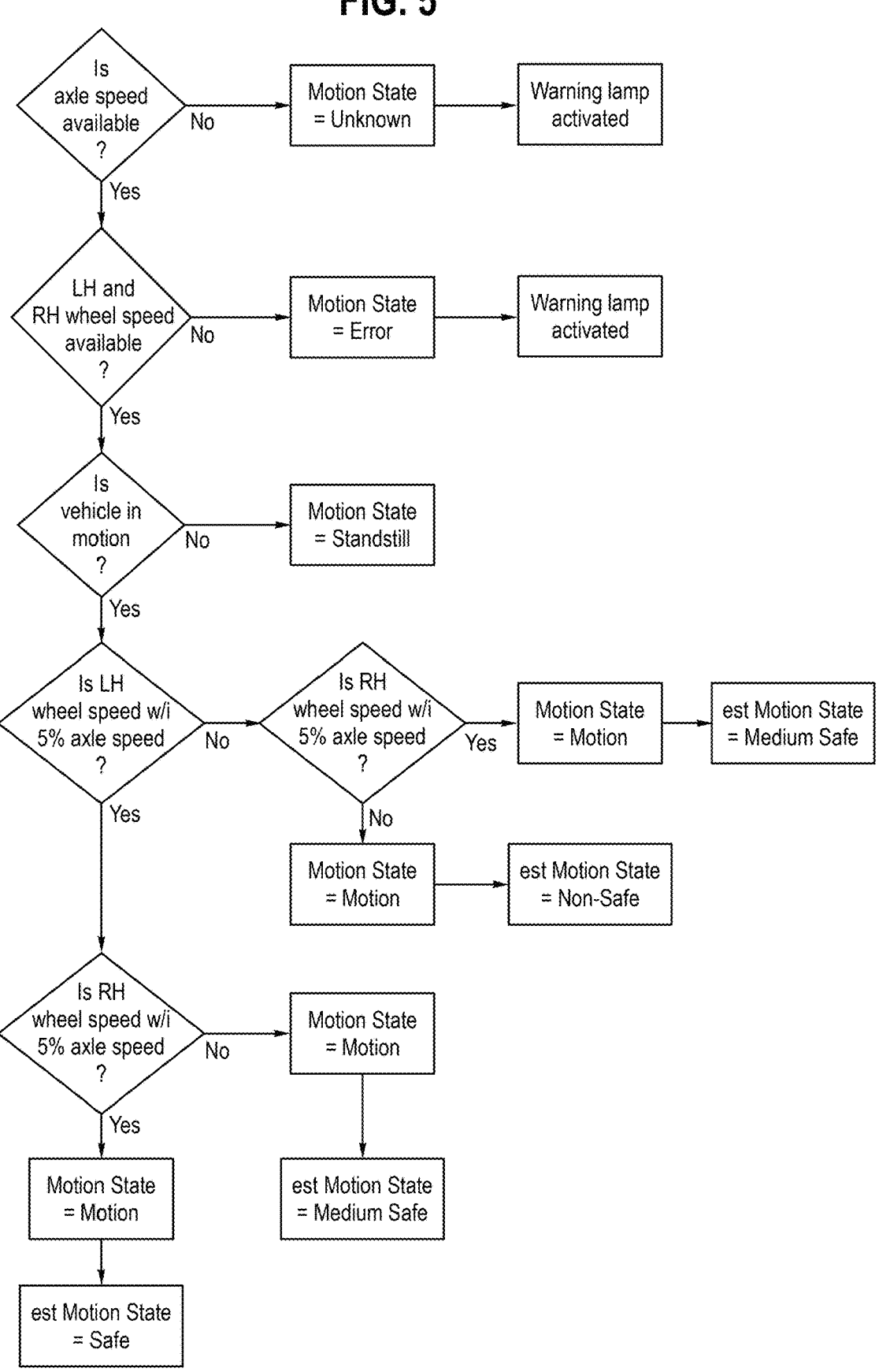
FIG. 5 is a schematic block diagram illustrating one embodiment for determining a motion state of the vehicle.

In one embodiment, and referring to FIG. 5, the electronic brake control unit 100 receives a front axle speed signal indicating a vehicle speed is formed from two wheel speed sensors 10, 12, for example and without limitation a front axle, right wheel speed sensor and a front axle, left hand wheel speed sensor. If each of the right and left wheel speeds are within a certain range of the vehicle speed, for example and without limitation within 5% of the vehicle speed, or e.g., within 5% of the front axle speed, then the electronic brake control unit 100 will send a quality indictor signal of high quality to the electronic park brake control unit 82. It should be understood that 5% is one suitable example, and that other limits, greater or less than 5%, on the percent deviation may also be suitable. The vehicle speed may be determined by various components and systems, including without limitation wheel speed sensors, GPS, radar, and other suitable devices and/or systems. In addition to looking at the % deviation, other embodiments may include a relation check, GPS, radar, a correlation of axle speed (or wheel speed) with GPS, and other suitable comparisons. The electronic park brake control unit 82 will then set the vehicle motion estimation state to "safe." If the front axle speed is above the vehicle standstill limit, plus vehicle speed standstill limit hysteresis, for example, >7 km/h=5 km/h+2 km/h, then the electronic park brake control unit 82 will set the vehicle motion state to "motion," and if the axle speed is less than, or <7 km/h, then the vehicle motion state is set to "standstill." In other words, if wheel speed is available, >5 km/h (7 km/h with hysteresis) and quality is ASIL D ("high quality"), then the motion state can be set to motion 1, where the electronic parking brake is fully operational. The "motion" setting is the lowest speed where the wheel speed sensors are deemed accurate. Some passive wheel speed sensors may have difficulty detecting motion when vehicle speeds are very low. Active wheel speed sensors are more able to detect motion at very low speeds.

If the front axle speed signal indicates a vehicle speed is formed from two wheel speed sensors 10, 12, but one of the right and left wheel speeds are not within 5% of the vehicle speed, or e.g., within 5% of the front axle speed, then the electronic brake control unit 100 will send a quality indictor signal of medium quality (ASIL B) to the electronic park brake control unit 82. As noted above, the vehicle speed may be determined by various components and systems, including without limitation wheel speed sensors, GPS, radar, and other suitable devices and/or systems. In addition to looking at the % deviation, other embodiments may include a relation check, GPS, radar, a correlation of axle speed (or wheel speed) with GPS, and other suitable comparisons. The electronic park brake control unit 82 will then set the vehicle motion estimation state to "medium safe." If the front axle speed is above the vehicle standstill limit, plus vehicle speed standstill limit hysteresis, or >7 km/h=5 km/h+2 km/h, then the electronic park brake control unit 82 will set the vehicle motion state to "motion," and if the axle speed is less than, or <7 km/h, then the vehicle motion state is set to "standstill." In this state, the electronic park brake control unit 82 is configured to output a warning signal that the quality indicator signal is medium quality, with the warning signal activating a warning lamp 102, which is visible to the operator. One or more advanced functionalities that require correct speed information to function, including for example and without limitation an anti-roll-away feature and/or an external park brake request, may be disabled if the quality indicator signal is medium quality.

If the front axle speed signal indicates a vehicle speed is formed from two wheel speed sensors, but both of the right and left wheel speeds are not within 5% of the vehicle speed, or e.g., within 5% of the front axle speed, then the electronic brake control unit 82 will send a quality indictor signal of low quality (QM). It should be understood that 5% is one suitable example, and that other limits, greater or less than 5%, on the percent deviation may also be suitable. As noted above, the vehicle speed may be determined by various components and systems, including without limitation wheel speed sensors, GPS, radar, and other suitable devices and/or systems. In addition to looking at the % deviation, other embodiments may include a relation check, GPS, radar, a correlation of axle speed (or wheel speed) with GPS, and other suitable comparisons. The electronic park brake control unit 82 will then set the vehicle motion estimation state to "non-safe." If the front axle speed is above the vehicle standstill limit, plus vehicle speed standstill limit hysteresis, or >7 km/h=5 km/h+2 km/h, then the electronic park brake control unit will set the vehicle motion state to "motion," and if the axle speed is less than, or <7 km/h, then the vehicle motion state is set to "standstill." In this state, the electronic park brake control unit is configured to output the warning signal that the quality indicator signal is medium quality, with the warning signal activating the warning lamp 102, which is visible to the operator. One or more advanced functionalities that require correct speed information to function, including for example and without limitation an anti-roll-away feature and/or an external park brake request, may be disabled if the quality indicator signal is medium quality.

In other words, if wheel speed is available, >5 kph and quality is ASIL B or QM, then the motion state can be set to motion 2 or motion 3, where the electronic parking brake is partially operational, by shutting down advanced functionality like ARA and/or EAS but maintaining the manual operation in manual mode. If the vehicle is in autonomous mode, the reduced operation may be to shutdown functions such as ARA but still accept inputs/requests from an external unpark request feature, for example CAN based park/unpark requests, for example exhaust at speed.

Figure 4:
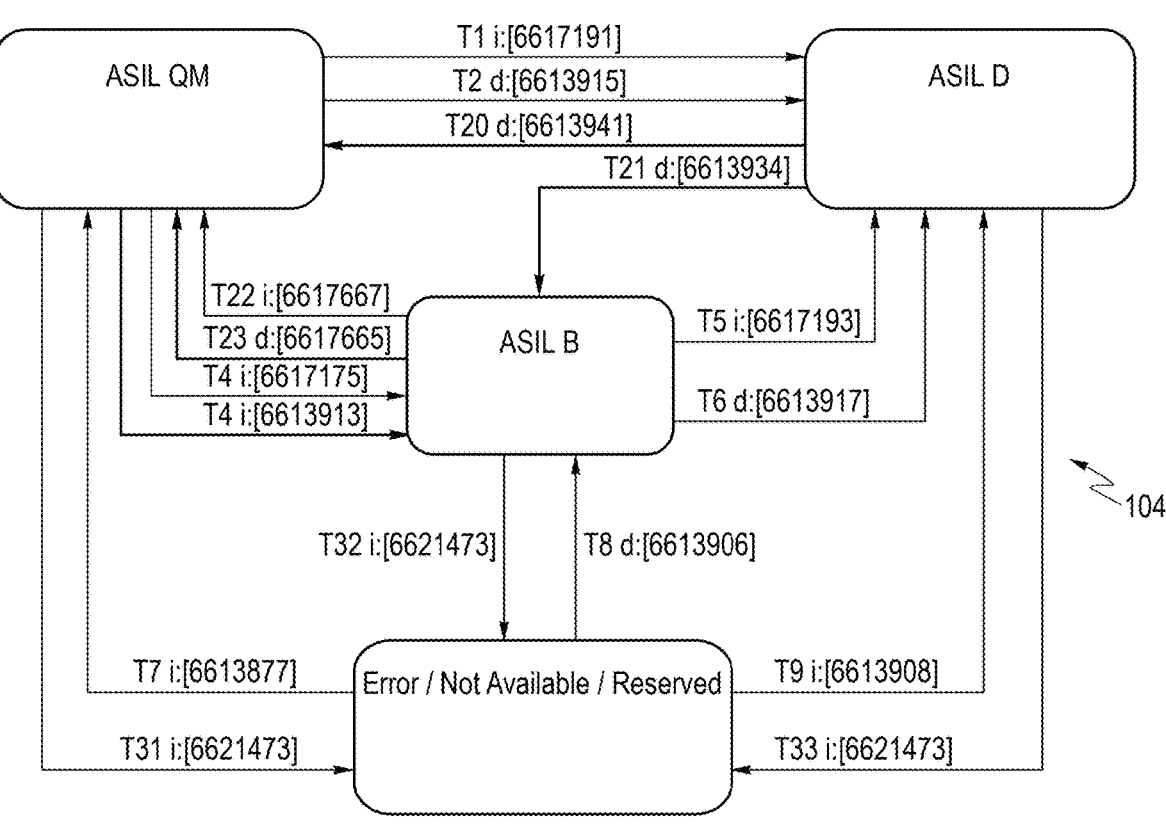
FIG. 4 is a schematic of a motion quality indicator signal filter.

As shown in FIG. 4. a quality filter 104 may be provided to delay the response change in quality from ASIL D to QM or ASIL B and vice-versa to increase the robustness of the system.

If the front axle speed signal is not available, or invalid, then the vehicle motion estimation state will be set to "not available," and the vehicle motion state will be set to "motion." If the system indicates a vehicle speed is formed from two wheel speed sensors, but both of the right and left wheel speeds are not within 5% of the front axle speed, then the electronic brake control unit will send quality indictor signal of low quality (QM). One or more advanced functionalities that require correct speed information to function, including for example and without limitation an anti-roll-away feature and/or an external park brake request, may be disabled if the quality indicator signal is low quality.

In other embodiments, the vehicle includes the front axle 4, or a steer axle, and also one or more following axles 14, 16. The following axle(s) may include third and fourth wheel sensors 26, 28, 30, 32 that provide third and fourth wheel speed inputs to the electronic control unit 100.

In other embodiments, the speed input may include signals received from a radar system 120, a lidar system 122, one or more cameras 124, a global positioning system 126 and/or vision sensors 128. The signals may be compared with each other, or with the axle speed, in order to determine a quality indicator signal that may be transmitted to the electronic park brake control unit. Indeed, the system may compare any two signals, including without limitation alternate speed courses, such as GPS, radar, cameras, and other suitable device signals. In this way, and with reference to FIG. 5, it should be understood that similar logic may be implemented for such systems having other speed inputs besides wheel speed inputs, for example determining if such inputs are within a predetermined range of a vehicle speed input, and determining the quality of the vehicle speed input signal based on the deviations therefrom. It should be understood that the quality of the signal, in one embodiment, may be determined by a comparison of a single speed input v. a vehicle speed input, for example comparing a GPS signal v. a vehicle speed signal, and if the deviation is outside a certain range, the quality would be deemed less than high quality.

In operation, a method of operating the electronic park brake system 40 includes comparing first and second speed inputs communicated to a first electronic control unit 100, providing a quality indicator signal from the first electronic control unit 100 indicating a quality of a vehicle speed signal, receiving the quality indicator signal and the vehicle speed signal with an electronic park brake control unit 82, determining a motion state of the vehicle 2 with the electronic brake control unit 82, and maintaining or disabling an operation of an electronic park brake, specifically the advanced features, based on the quality indicator signal and the motion state of the vehicle. The operation further includes outputting a warning signal from the electronic brake control if the quality indicator signal is one of the medium quality indicator signal or the low quality indicator signal, and may include activating a warning lamp 102 with the warning signal.

Various dedicated hardware implementations, such as application specific integrated circuits, programmable logic arrays and other hardware devices, may be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In one embodiment, a radio, CAN, LIN, Ethernet, or other embodiments of a communication interface, may provide for data and/or signal communication from the control modules to other components of the brake system, or an external device such as a mobile phone or other computing device. The communication interface communicates the data using any operable connection. An operable connection may be one in which signals, physical communications, and/or logical communications may be sent and/or received. An operable connection may include a physical interface, an electrical interface, and/or a data interface. The communication interface may be configured as the wireless communication system which communicates wirelessly, and as such may include one or more antennae, or may include a hard wired system. The communication interface may provide for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth® and or ANT+™ standards may also, or alternatively, be used. Accordingly, replacement standards and protocols having the same or similar functions as those disclosed herein are considered equivalents thereof.

The DECU 82 may include one or more buttons, keypad, keyboard, mouse, stylus pen, trackball, rocker switch, touch pad, voice recognition circuit, or other device or component for communicating data between a user and the DECU. The DECU may be a touch screen, which may be capacitive or resistive. The DECU may include a liquid crystal display ("LCD") panel, light emitting diode ("LED"), LED screen, thin film transistor screen, or another type of display. The DECU may also include audio capabilities, or speakers.

In an embodiment, the DECU 82 may include the warning lamp 102, which may be an LED indicator. The LED indicator lights to indicate warnings, or input of the commands or other actions of the park brake system.

The DECU 82 and the electronic brake control unit 100 are configured to send and/or receive data such as control signals and/or commands to and/or from each other and various brake components. The DECU 82, and electronic brake control unit 100, communicate the data using any operable connection. An operable connection may be one in which signals, physical communications, and/or logical communications may be sent and/or received. An operable connection may include a physical interface, an electrical interface, and/or a data interface. The DECU 82 and the electronic brake control unit 100 may provide for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with various embodiments of the present disclosure, methods described herein may be implemented with software programs executable by a computer system, such as the circuitry. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or one or more of the control modules, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

What is claimed is:

1. An electronic park brake system comprising:
a first electronic control unit configured to:
  receive wheel speeds from first and second wheel speed sensors in a vehicle;
  perform a comparison of the wheel speeds from the first and second wheel speed sensors with a speed of the vehicle; and
  generate a quality indicator signal indicating a quality of the wheels speeds from the first and second wheel speed sensors based on the comparison, wherein the quality indicator signal is high if the wheel speeds from both the first and second wheel speed sensors are within a threshold of the speed of the vehicle; and
an electronic park brake control unit configured to:
  in response to the quality indicator signal being high, operate in a full operational state to engage or release a park brake of the vehicle based on the wheel speeds from the first and second wheel speed sensors; and
  in response to the quality indicator signal not being high, operate in a limited operational state.

2. The electronic park brake system of claim 1 wherein the electronic park brake control unit is configured to output a warning signal if the quality indicator signal is one of the medium quality indicator signal or the low quality indicator signal.

3. The electronic park brake system of claim 2 wherein the warning signal is configured to activate a warning lamp.

4. The electronic park brake system of claim 1 wherein the electronic park brake control unit is configured to determine a motion state, and wherein the motion state comprises a standstill state or an in-motion state.

5. The electronic park brake system of claim 4 wherein the in-motion state corresponds to vehicle motion.

6. The electronic park brake system of claim 1 wherein the first and second wheel speed sensors are positioned at left and right wheels of a vehicle axle.

7. The electronic park brake system of claim 6 wherein the vehicle axle comprises a steer axle, and further comprising a following axle, wherein the following axle comprises third and fourth wheel speed sensors providing third and fourth wheel speed inputs to the first electronic control unit.

8. The electronic park brake system of claim 1 wherein the speed of the vehicle is determined from a radar system, a lidar system, one or more cameras, a global positioning system and/or vision sensors.

9. The electronic park brake system of claim 1 wherein the operational state comprises one or more advanced functionalities.

10. A method of operating an electronic park brake system comprising:
  performing a comparison of wheel speeds from first and second wheel speed sensors with a speed of the vehicle;
  generating a quality indicator signal indicating a quality of the wheels speeds from the first and second wheel speed sensors based on the comparison, wherein the quality indicator signal is high if the wheel speeds from both the first and second wheel speed sensors are within a threshold of the speed of the vehicle; and
  in response to the quality indicator signal being high, operating in a full operational state to engage or release a park brake of the vehicle based on the wheel speeds from the first and second wheel speed sensors; and
  in response to the quality indicator signal not being high, operating in a limited operational state.

11. The method of claim 10 further comprising outputting a warning signal from the electronic park brake control if the quality indicator signal is one of a medium quality indicator signal or a low quality indicator signal.

12. The method of claim 11 further comprising activating a warning lamp with the warning signal.

13. The method of claim 10 further comprising determining a motion state, wherein the motion state comprises a standstill state or an in-motion state.

14. The method of claim 13 wherein the in-motion state corresponds to vehicle motion.

15. The method of claim 10 wherein the speed of the vehicle is determined from a radar system, a lidar system, one or more cameras, a global positioning system and/or vision sensors.

* * * * *